(12) United States Patent
Lasell (10) Patent No.: US 10,227,023 B2
(45) Date of Patent: Mar. 12, 2019

(54) ENERGY ABSORBING BRACKETS FOR PASSENGER SEATS

(71) Applicant: Zodiac Seats US LLC, Gainesville, TX (US)

(72) Inventor: Donald M. Lasell, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/554,049

(22) PCT Filed: Jan. 26, 2016

(86) PCT No.: PCT/US2016/014847
§ 371 (c)(1),
(2) Date: Aug. 28, 2017

(87) PCT Pub. No.: WO2016/160106
PCT Pub. Date: Oct. 6, 2016

(65) Prior Publication Data
US 2018/0264979 A1    Sep. 20, 2018

Related U.S. Application Data

(60) Provisional application No. 62/170,433, filed on Jun. 3, 2015, provisional application No. 62/140,498, filed on Mar. 31, 2015.

(51) Int. Cl.
*B60N 2/42* (2006.01)
*B60N 2/68* (2006.01)
(Continued)

(52) U.S. Cl.
CPC ........ *B60N 2/4249* (2013.01); *B29C 44/1228* (2013.01); *B60N 2/4221* (2013.01);
(Continued)

(58) Field of Classification Search
CPC ... B60N 2/4249; B60N 2/42709; B60N 2/682
(Continued)

(56) References Cited

U.S. PATENT DOCUMENTS 4,099,780 A * 7/1978 Schmidhuber ......... B64D 11/06
297/232
4,186,964 A * 2/1980 Marrujo ............. B64D 11/0646
297/411.45
(Continued)

FOREIGN PATENT DOCUMENTS

EP     2186671    5/2010
GB     2468365    9/2010
(Continued)

OTHER PUBLICATIONS

International Patent Application No. PCT/US2016/014847, Search Report and Written Opinion, dated May 31, 2016.

*Primary Examiner* — Syed A Islam
(74) *Attorney, Agent, or Firm* — Kilpatrick Townsend & Stockton LLP; Dean W. Russell; Tyler T. McAllister (57) ABSTRACT

Seat assemblies including seat brackets and spreader brackets are described. A seat bracket can include an upper portion, a lower portion, and a frangible portion. The frangible portion can be formed from composite material and include a particular layer orientation. A spreader bracket can include a first component configured to couple with a second component to form a coupled structure. A structural fill material can be disposed within the coupled structure. The first component and the second component can be formed from composite material.

24 Claims, 9 Drawing Sheets

(51) Int. Cl.
    *B60N 2/427*   (2006.01)
    *B29C 44/12*   (2006.01)
    *B29L 31/58*       (2006.01)
    *B29K 23/00*       (2006.01)
    *B29K 25/00*       (2006.01)
    *B29K 75/00*       (2006.01)
    *B29L 31/00*       (2006.01)
    *B29K 101/12*      (2006.01)
    *B29K 105/04*      (2006.01)
    *B29K 707/04*      (2006.01)

(52) U.S. Cl.
    CPC ......... *B60N 2/42709* (2013.01); *B60N 2/682* (2013.01); *B60N 2/688* (2013.01); *B29K 2023/12* (2013.01); *B29K 2025/06* (2013.01); *B29K 2075/00* (2013.01); *B29K 2101/12* (2013.01); *B29K 2105/04* (2013.01); *B29K 2707/04* (2013.01); *B29K 2995/0063* (2013.01); *B29K 2995/0091* (2013.01); *B29L 2031/58* (2013.01); *B29L 2031/771* (2013.01)

(58) Field of Classification Search
    USPC .............................. 297/452.11, 216.14, 216.1
    See application file for complete search history.

(56) References Cited

U.S. PATENT DOCUMENTS

| | | | | |
|---|---|---|---|---|
| 6,322,148 | B1 * | 11/2001 | Kolena | B60N 2/682 297/354.12 |
| 7,354,019 | B2 * | 4/2008 | Bauer | A47C 7/74 244/118.6 |
| 7,360,832 | B2 * | 4/2008 | Yokota | B60N 2/4228 297/216.1 |
| 7,537,283 | B2 * | 5/2009 | Niitsuma | B60N 2/4214 297/216.1 |
| 7,959,232 | B2 * | 6/2011 | Sawada | B60N 2/686 297/16.2 |
| 8,511,748 | B2 * | 8/2013 | McLeod | B60N 2/686 297/216.1 |
| 8,845,019 | B2 * | 9/2014 | Sawada | B60N 2/20 297/216.1 |
| 8,955,906 | B2 * | 2/2015 | Evans | B60N 2/4228 297/216.13 |
| 9,027,993 | B2 * | 5/2015 | Munemura | B60N 2/42754 248/421 |
| 9,365,138 | B2 * | 6/2016 | Mueller | B60N 2/90 |
| 2005/0140190 | A1 * | 6/2005 | Kawashima | B60N 2/4228 297/216.14 |
| 2006/0103191 | A1 * | 5/2006 | De Wilde | B60N 2/427 297/216.14 |
| 2011/0210592 | A1 * | 9/2011 | Watanabe | B60N 2/22 297/354.1 |
| 2013/0221725 | A1 * | 8/2013 | Yamada | B60N 2/682 297/452.18 |
| 2014/0103626 | A1 * | 4/2014 | Seki | B60N 2/4228 280/730.2 |

FOREIGN PATENT DOCUMENTS

| | | |
|---|---|---|
| WO | 2008/019981 | 2/2008 |
| WO | 2013/021485 | 2/2013 |
| WO | 2013/109751 | 7/2013 |

* cited by examiner

ENERGY ABSORBING BRACKETS FOR PASSENGER SEATS

CROSS REFERENCE TO RELATED APPLICATIONS

This patent application is the U.S. national stage entry of PCT/US2016/014847 ("the '847 application"), filed on Jan. 26, 2016, which application is related to and claims the benefit of priority from U.S. Provisional Application Ser. No. 62/140,498 ("the '498 application"), filed on Mar. 31, 2015, entitled "Seatback Breakover Device (Improved)" and U.S. Provisional Application Ser. No. 62/170,433 ("the '433 application"), filed on Jun. 3, 2015, entitled "Lightweight Composite Impact Energy Absorbing Seat Spreader." Each of the '847 application, the '498 application, and the '433 application is hereby incorporated in its entirety by this reference.

FIELD OF THE INVENTION

The field of the invention relates to energy absorbers in seat assemblies for passenger seats or the like.

BACKGROUND

Head Injury Criterion ("HIC") is a measure of the likelihood of head injury resulting from an impact. The HIC is used to assess safety related to occupants. Normally, this variable is derived from the acceleration/time history of an accelerometer mounted at the center of gravity of a dummy's head when the dummy is exposed to crash forces. As a result, HIC includes the effects of head acceleration and the duration of the acceleration (i.e., large accelerations may be tolerated if the duration is very short).

Conventionally, energy dissipation solutions in passenger seats have focused on allowing the passenger seatback to pivot forward in a controlled manner via features located in the lower back area of the passenger seatback that give way under a certain load. Generally, these features include metallic brackets with a designed shear area or shear bolts that are attached to the back diaphragm of the seat. These metallic brackets, however, may shear at inconsistent loads as a result of the composition of the metals and metal fatigue due to ongoing use. Shearing at inconsistent loads can lead to difficulties and often unacceptable HIC. In addition, when weight is a consideration, the use of metal for these brackets and other energy dissipation brackets can be prohibitive.

SUMMARY

Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, a seat assembly can include a frame, a set of spreader brackets and a set of seat brackets. The set of spreader brackets can be attached to the frame. Each spreader bracket can include a first component formed from a composite material, a structural fill material, and a second component formed from the composite material. The second component can be configured to couple with the first component to form a coupled structure. The structure fill material can extend within a cavity of the coupled structure. The set of seat brackets can be attached to the set of seat spreader brackets. Each seat bracket can include a frangible structure formed from a plurality of layers of composite material. The plurality of layers can be arranged such that first layers of the plurality of layers are discontinuous throughout a shear area of the frangible structure and second layers of the plurality of layers are continuous throughout the shear area of the frangible structure. The frangible structure can be configured to break at or near the shear area in response to a force applied to a seatback.

In some examples, the seat assembly can further include a seat pan disposed between lower portions of the set of spreader brackets and the seatback disposed between upper portions of the set of spreader brackets and attached to the set of spreader brackets.

In some examples, each seat bracket can also include a lower portion attached to the seat pan, an upper portion attached to the seatback at a first location and at least one spreader bracket, and a middle portion corresponding to the frangible structure that is attached to the seatback at a second location.

In some examples, each of the first component and the second component can include first flange, a second flange, and a web extending between the first flange and the second flange.

According to certain examples, an assembly can include a spreader bracket that includes a first hollow component formed from a composite material, a fill material, and a second hollow component formed from the composite material. The second hollow component can be configured to couple with the first hollow component to form a coupled structure. The fill material can extend within a cavity of the coupled structure. The coupled structure can include a first leg extending in a first direction and including one or more one upper mounting locations, and a second leg extending in a second direction and including one or more lower mounting locations disposed along a bottom portion of the second leg.

In some examples, the one or more upper mounting locations can include a seatbelt anchor extending within the cavity of the coupled structure from a first exterior surface on a first web of the first hollow component to a second exterior surface on a second web of the second hollow component.

In some examples, the coupled structure can further include a first reinforcing zone comprising first one or more layers of the composite material disposed on the first web and extending between the seatbelt anchor and a first front flange of the first hollow component, and a second reinforcing zone including second one or more layers of the composite material disposed on the second web and extending between the seatbelt anchor and a second front flange of the second hollow component.

In some examples, the first one or more layers of the first reinforcing zone and the second one or more layers of the second reinforcing zone are selected such that, in an crash event, the seatbelt anchor moves toward the first front flange and the second front flange by crushing a portion of the fill material, a portion of the first reinforcing zone, and a portion of the second reinforcing zone.

In some examples, the one or more mounting locations can include one or more tubular cavities extending through the cavity of the coupled structure from a first exterior surface on a first web of the first hollow component to a second exterior surface on a second web of the second hollow component.

In some examples, the fill material can include an energy absorbing foam material having a density of about 10 pounds per cubic foot.

In some examples, the composite material can be a thermoplastic structural composite or a thermoset structural composite.

In some examples, each hollow component of the first hollow component and the second hollow component can include a first flange, a second flange, and a web extending between the first flange and the second flange. In some examples, at least one of the first flange or the second flange can have a flange thickness that is greater than a web thickness of the web.

In some examples, in the coupled structure, an interior surface of the first hollow component can contact an exterior surface of the second hollow component. In some examples, in the coupled structure, an exterior surface of the first hollow component can include one or more darts disposed between the first leg and the second leg.

In some examples, the assembly can further include a seat bracket. The seat bracket can include an attachment location at which the seat bracket is attached to the spreader bracket, and a frangible portion disposed below the attachment location and formed from a plurality of layers of the composite material. In some examples, in a dominant layer orientation, the plurality of layers can be arranged such that first layers of the plurality of layers are discontinuous throughout a shear area of the frangible portion, and second layers of the plurality of layers can be continuous throughout the shear area of the frangible portion. In some examples, the frangible portion can be configured to break at or about the shear area in response to a force applied to a seatback. In some examples, the shear area can be a first shear area. The plurality of layers can further be arranged such that the first layers of the plurality of layers are discontinuous throughout a second shear area of the frangible portion, and the second layers of the plurality of layers are continuous throughout the second shear area of the frangible portion, the frangible portion configured to break at or about the first shear area and the second shear area in response to the force applied to the seatback.

According to certain examples, an assembly can include a seat bracket. The seat bracket can include an upper portion having a first attachment location, a lower portion having a second attachment location, and a frangible portion disposed between the upper portion and the lower portion and formed from a plurality of layers of composite material. In a particular layer orientation, the plurality of layers can be arranged such that first layers of the plurality of layers are discontinuous throughout a shear area of the frangible portion, and second layers of the plurality of layers are continuous throughout the shear area of the frangible portion, the frangible portion being configured to break at the shear area when a predefined force is applied to the assembly.

In some examples, the shear area can be a first shear area, and the plurality of layers can be further arranged such that the first layers of the plurality of layers are discontinuous throughout a second shear area of the frangible portion, and the second layers of the plurality of layers are continuous throughout the second shear area of the frangible portion. In some examples, the frangible portion can be configured to break at or about the first shear area and the second shear area in response to the force applied to the assembly.

In some examples, the plurality of layers can be further arranged such that third layers of the plurality of layers are continuous throughout the first shear area and the second shear area.

In some examples, the particular layer orientation can be a dominant layer orientation and the plurality of layers of composite material can include other layers arranged in at least one other orientation comprising an orthogonal layer orientation that is orthogonal to the dominant layer orientation or a transverse orientation that is transverse to the dominant layer orientation.

In some examples, a spreader bracket can be attached to the seat bracket at the first attachment location. The spreader bracket can include a first component formed from the composite material, a fill material, and a second component formed from the composite material. The second component can be configured to couple with the first component to form a coupled structure. The fill material can extend within a cavity of the coupled structure.

In some examples, the frangible portion can include a third attachment location. The seat assembly can further include a seat pan attached to the seat bracket at the second attachment location, and a seatback attached to the seat bracket at the third attachment location and the first attachment location.

In some examples, the coupled structure can further include a first leg extending in a first direction and that includes a seat belt anchor extending within the cavity of the coupled structure from a first exterior surface of a first web of the first component to a second exterior surface of a second web of the second component. The coupled structure can also include a second leg extending in a second direction. The second direction can be separated from the first direction by a first angle.

In some examples, during an crash event, the frangible portion can be configured such that application of the predefined force to an aft surface of the seatback causes the frangible portion to break at the sheer area and an upper portion of the seatback to pivot about the first attachment location in a forward direction. The seatbelt anchor can also be configured such that the seatbelt anchor moves through the cavity of the coupled structure towards a first flange of the first component and a second flange of the second component located on a forward side of the coupled structure. The coupled structure can be configured such that the first leg rotates relative to the second leg to form a second angle that is less than the first angle.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of the individual steps or arrangement of elements is explicitly described.

Embodiments described herein can include spreader brackets and seat brackets that are formed of carbon fiber reinforced composite material. These devices can be manufactured in order to absorb energy during a crash event in a predictable manner. Doing so can reduce impact energy being transferred through the passenger seat assemblies to the floor mounting locations, decelerate occupants during crash events, and reduce the amount of impact energy being transferred to the heads of the occupants, all of which may affect HIC. This may be achieved, at least in part, by constructing the devices of composite material and designing areas within the devices to crumple, bend, break, or otherwise absorb energy. The overall construction of these devices, including these areas, can be tuned by adjusting certain parameters (e.g., thickness of composite material, direction of carbon fibers in composite material, overlaps and cuts of carbon fiber layers in composite material) and designing specific areas for energy absorption. While the spreader brackets and seat brackets are discussed for use with aircraft seats, they are by no means so limited. Rather, embodiments of the spreader brackets and seat brackets may be used in passenger seats or other seats of any type or otherwise as desired.

An example spreader bracket can function to support certain features of a seat assembly. The spreader bracket can generally have an L shape and can be formed from two separate components of composite material (e.g., carbon fiber reinforced polymers). Forming the spreader bracket from composite material may result in weight reduction as compared to metallic brackets and allow for enhanced energy absorption. Each of the two components can have a hollow shape with a C-shaped cross-section, with one of the components sized slightly larger than the other such that flanges of the smaller component will interlock within the hollow interior of the larger component. Once the two components are brought together in this manner, they can form an interlocked box-shaped structure. The box-shaped structure can be filled with a structural foam which can function to adhesively hold the two components together and provide structural strength. Certain areas of the two components may constructed to deflect and/or crush during a crash event in order to absorb energy. For example, an area around a seat belt anchor disposed within the box-shaped structure can be designed to crush. The seat belt anchor may travel within the box-shaped structure and crush the area around the seat belt anchor. Such crushing may absorb energy of the crash event.

An example seat bracket can be attached to a spreader bracket, a seatback, and a seat pan of a seat assembly. The seat bracket can be referred to as a quadrant arm, a breakover device, or a seatback bracket. The seat bracket can generally have an elongated shape and can be formed of composite material (e.g., carbon fiber reinforced polymers). Forming the seat bracket from composite material may result in weight reduction as compared to metallic brackets and allow for energy absorption and more predictable breakage during seatback breakover. During manufacture of the seat bracket, layers of composite materials can be formed in a manner that creates a frangible mounting location. A breakaway portion within the frangible mounting location can be attached to the seatback and can be designed to tear, break, or otherwise fail in response to a load being applied to a rear surface of the seatback. For example, such a load may be applied to the rear surface of the seatback during a crash event by an occupant seated behind the seat assembly. In order to limit the damage to the occupant, the breakaway portion may fail and cause the seatback to freely rotate forward ("breakover") out of the swing radius of the occupant's upper body.

Figure 1:
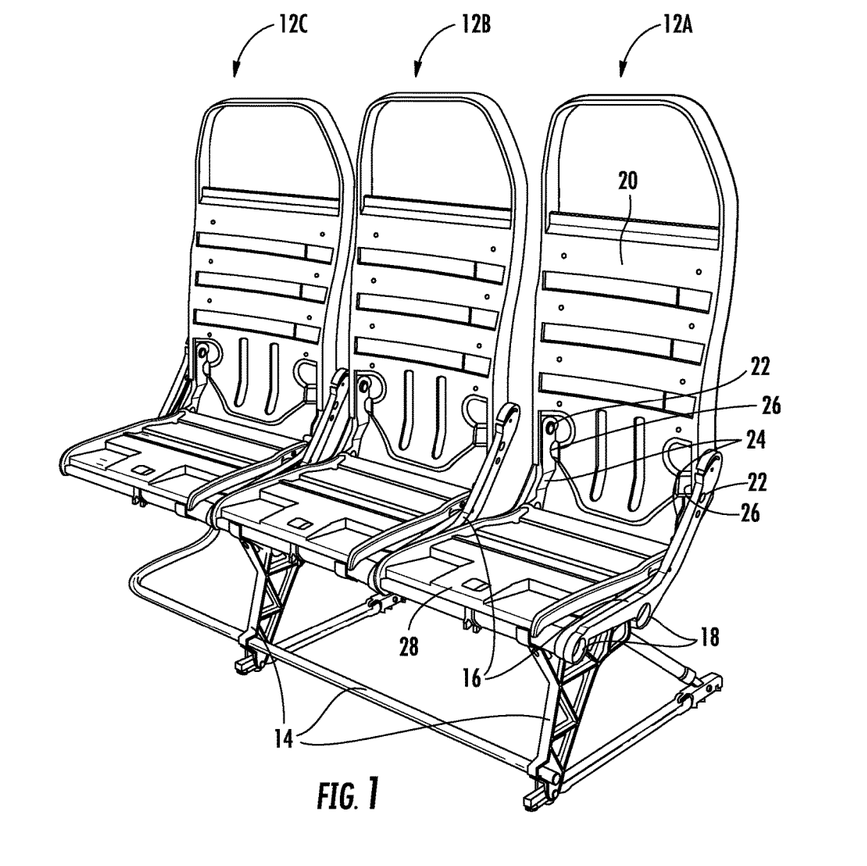
FIG. 1 is a perspective view of a seat assembly including spreader brackets and seat brackets, according to certain embodiments.

Turning now to the figures, FIG. 1 illustrates a seat row assembly 10 that includes a set of seat assemblies 12A-12C. The seat row assembly 10 can include a frame 14 to which the set of seat assemblies 12A-12C can be attached and by which the set of seat assemblies 12A-12C may be supported. Typically, the frame 14 will be attached to the floor of a vehicle (e.g., an aircraft) in which the seat row assembly 10 is mounted. As illustrated, the frame 14 supports all three seat assemblies 12A-12C. It is understood, however, that each seat assembly 12A-12C can include its own frame that functions similarly as the frame 14.

Each seat assembly 12 includes a set of spreader brackets 16 disposed above the frame 14 and attached to the frame 14 at a set of lower mounting locations 18. The set of spreader brackets 16 can also be attached to a seatback 20 at a set of upper mounting locations 22. Certain auxiliary components of the seat assembly 12 (e.g., seatbelt, tray table, armrest, etc.) can be attached to the set of spreader brackets 16 at locations adjacent to the set of upper mounting locations 22.

The set of spreader brackets 16 is also be attached to a set of seat brackets 24 at the set of upper mounting locations 22. The set of seat brackets 24 is not only attached to the spreader brackets 16, but are also attached to a seat pan 28 and to the seatback 20 via a set of frangible mounting locations 26. In normal operation, the set of seat brackets 24 function to connect the seatback 20 and the seat pan 28 in a manner that allows the seat pan 28 to translate as the seatback 20 rotates. However, during a crash event when a predetermined load is applied to a back surface of the seatback 20, the frangible mounting location 26 of the set of seat brackets 24 fails, which will result in the seatback 20 freely rotating about the set of upper mounting locations 22 (without also causing the seat pan 28 to translate). This is because the set of frangible mounting locations 26 is disposed below the upper mounting locations 22 and is weaker than other areas of the set of seat brackets 24.

Figure 2:
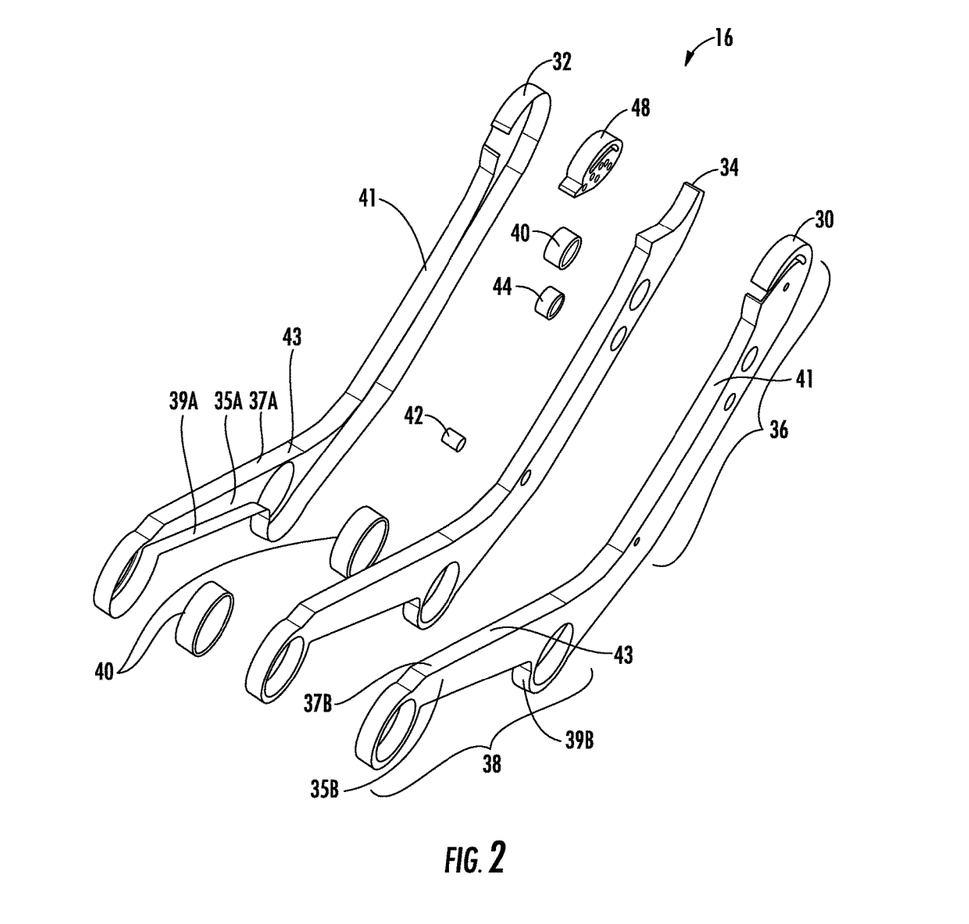
FIG. 2 is an exploded view of a spreader bracket from FIG. 1, according to at least one embodiment.

As illustrated in the exploded view of FIG. 2, the spreader bracket 16 includes a first component 30, a second component 32, and a structural fill material 34 disposed between the first component 30 and the second component 32. The structural fill material 34 can be injected, poured, or otherwise disposed within the spreader bracket 16 after the two components 30, 32 have been brought together. Each of the first component 30 and the second component 32 can have a hollow interior with C-shaped cross-section. Each of the components 30, 32 can include a web 35 disposed between a first flange 37 and a second flange 39. In this manner, the components 30, 32 can be formed to have hollow interiors. The overall shape of the spreader bracket 16 may correspond to an L having an upper portion 36 or an upper leg 41 and a lower portion 38 or a lower leg 43.

The first component 30 is sized slightly smaller than the second component 32. For example, a first width of the first component 30 taken from an exterior surface of the first flange 37B to an exterior surface of the second flange 39A may be less than a second width of the second component 32 taken from an interior surface of the first flange 37A to an interior surface of the second flange 39A. In this manner, the first component 30 may be sized to index within the second component 32 to form an interlocked structure having a box-shaped cross-section. When the first component 30 is disposed within the second component 32, an exterior surface of the flanges of the first component 30 may be in contact with an interior surface of the flanges of the second component 32. In some examples, the interior surface and the exterior surface may not be in contact, but may however be adjacently disposed.

The components 30, 32 may be formed from reinforced composite materials such as carbon fiber reinforced polymers, carbon fiber reinforced plastics, carbon fiber reinforced thermoplastics, or any other suitable reinforced composite material or combinations thereof. The components 30, 32 may be manufactured using any suitable composite manufacturing technique. Including, for example, thermoplastic structural composite techniques or thermoset structural composite techniques. The structural fill material 34 may be any suitable material having energy absorbing characteristics. For example, the structural fill material 34 may be an impact energy-absorbing foam. Including, for example, polypropylene, polyurethane, polystyrene, other suitable materials, and combinations thereof. In some examples, the structural fill material 34 functions to uniformly absorb impact energy. Depending on the application, the structural fill material 34 may have a density of about 5-10 pounds per cubic foot.

As illustrated in FIG. 2, the spreader bracket 16 can also include a set of tube bushings 40, a seatbelt anchor 42, a table pivot bushing 44, a seatback pivot bushing 46, and an arm rest mount 48. The tube bushings 40 can be embedded in the structural fill material 34. The tube bushings 40 can be formed from any suitable material including composite materials, plastic, or aluminum. The tube bushings 40 are disposed in the lower portion 38 of the spreader bracket 16 and may correspond to the set of lower mounting locations 18 discussed with reference to the seat assembly 12. In particular, the frame 14 can be attached to the spreader bracket 16 via the tube bushings 40.

The seatbelt anchor 42 can also be embedded in the structural fill material 34. The seatbelt anchor 42 can be formed from any suitable material such as steel. The seatbelt anchor 42 is disposed within the upper portion 36 of the spreader bracket 16. A first end of a seatbelt can be attached to the seatbelt anchor 42 and a second end of the seatbelt can be attached to a corresponding seatbelt anchor in a corresponding spreader bracket. The ends of the seatbelt can be attached to the seatbelt anchors 42 via any suitable combination of nuts and bolts, pins, rods, or any other suitable fastener.

The table pivot bushing 44 can also be embedded in the structural fill material 34 and can be formed from any suitable material such as composite material, plastic, or aluminum. The table pivot bushing 44 is disposed within the upper portion of the spreader bracket 16. The table pivot bushing 44 can be configured to receive a first end of a tray table. A second end of the tray table can be received by a corresponding table pivot bushing in a corresponding spreader bracket. The table pivot bushing 44 can be configured to allow the tray table to rotate from a deployed position to a stowed position. The ends of the tray table can be attached to the table pivot bushings 44 via any suitable combination of nuts and bolts, pins, rods, or any other suitable fastener.

The seatback pivot bushing 46 can also be embedded in the structural fill material 34. The seatback pivot bushing 46 can be formed from any suitable material such as composite material, plastic, or aluminum. The seatback pivot bushing 46 is disposed within the upper portion 36 of the spreader bracket 16 and can correspond to one mounting location of the set of upper mounting locations 22. For example, a first edge of the seatback 20 can be attached to the spreader bracket 16 via the seatback pivot bushing 46 and a second edge of the seatback 20 can be attached to a corresponding spreader bracket via a corresponding seatback pivot bushing. The seatback 20 can be attached to the spreader bracket 16 in a manner that allows the seatback 20 to pivot about the seatback pivot bushing 46. The edges of the seatback 20 can be attached to the seatback pivot bushings 46 via any suitable combination of nuts and bolts, pins, rods, or any other suitable fastener.

The arm rest mount 48 can also be embedded in the structural fill material 34. The arm rest mount 48 can be formed from any suitable material such as composite material, plastic, or aluminum. The arm rest mount 48 is disposed within the upper portion 36 of the spreader bracket 16 and above the table pivot bushing 44 and the seatback pivot bushing 46. The arm rest mount 48 can be configured for mounting an arm rest. The arm rest mount 48 can be constructed such that the arm rest can pivot, swing, and be locked in one or more positions.

The components 30, 32 can be manufactured using the techniques described herein. Afterwards, the two components 30, 32, and the set of tube bushings 40, the seatbelt anchor 42, the table pivot bushing 44, the seatback pivot bushing 46, and the arm rest mount 48 can be placed in a mold and held in their final locations by the mold. The structural fill material 34 may then be injected or poured into the cavity formed by the two components 30, 32 (e.g., the interior of the interlocked structure having a box-shaped cross-section, which is shown in FIG. 2 as being occupied by the structural fill material 34). The mold can be closed and locked while the structural fill material 34 expands within the cavity and adheres to the interior surfaces of the two components 30, 32 and the exterior surfaces of the set of tube bushings 40, the seatbelt anchor 42, the table pivot bushing 44, the seatback pivot bushing 46, and/or the arm rest mount 48. In this manner, the structural fill material 34 can function to adhere the two components 30, 32 together, with the set of tube bushings 40, the seatbelt anchor 42, the table pivot bushing 44, the seatback pivot bushing 46, and/or the arm rest mount 48 being permanently held in their position. The mold may also be baked to effectively cure the structural fill material 34.

Figure 3:
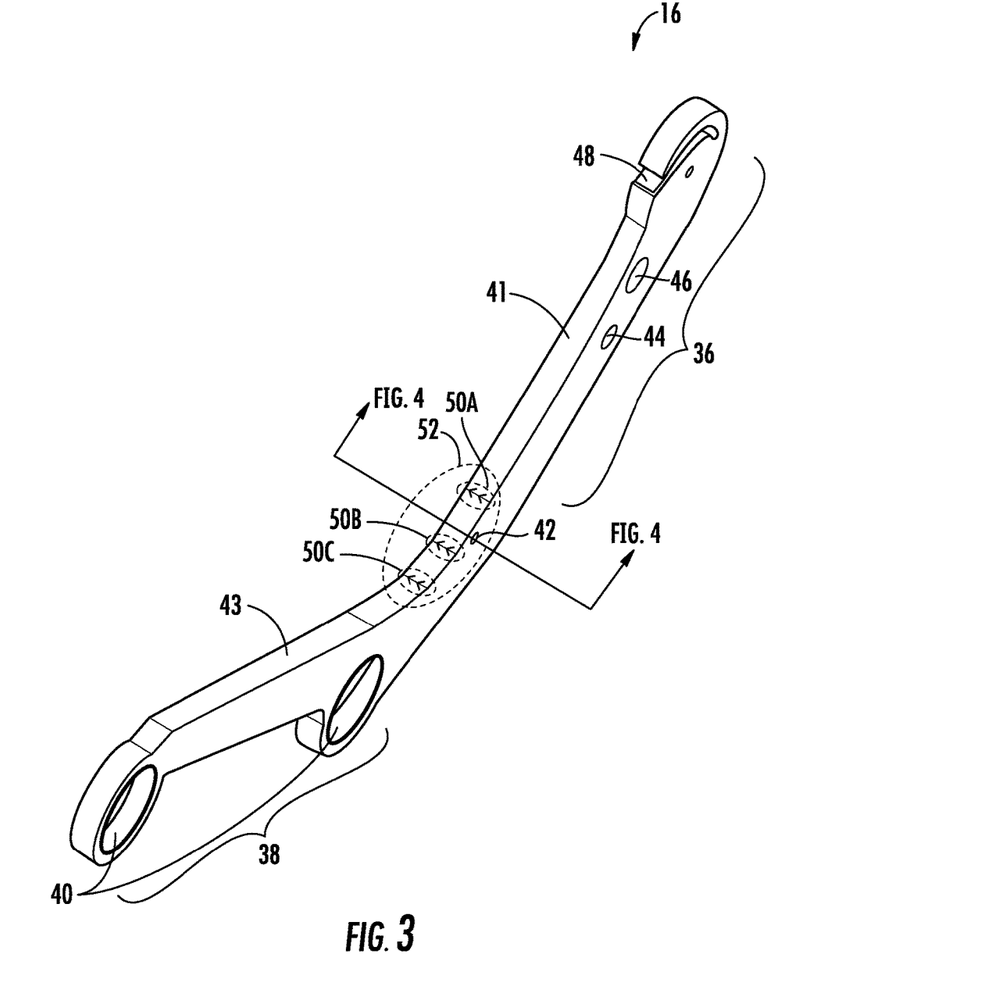
FIG. 3 is a perspective view of the spreader bracket of FIG. 2.
Figure 4:
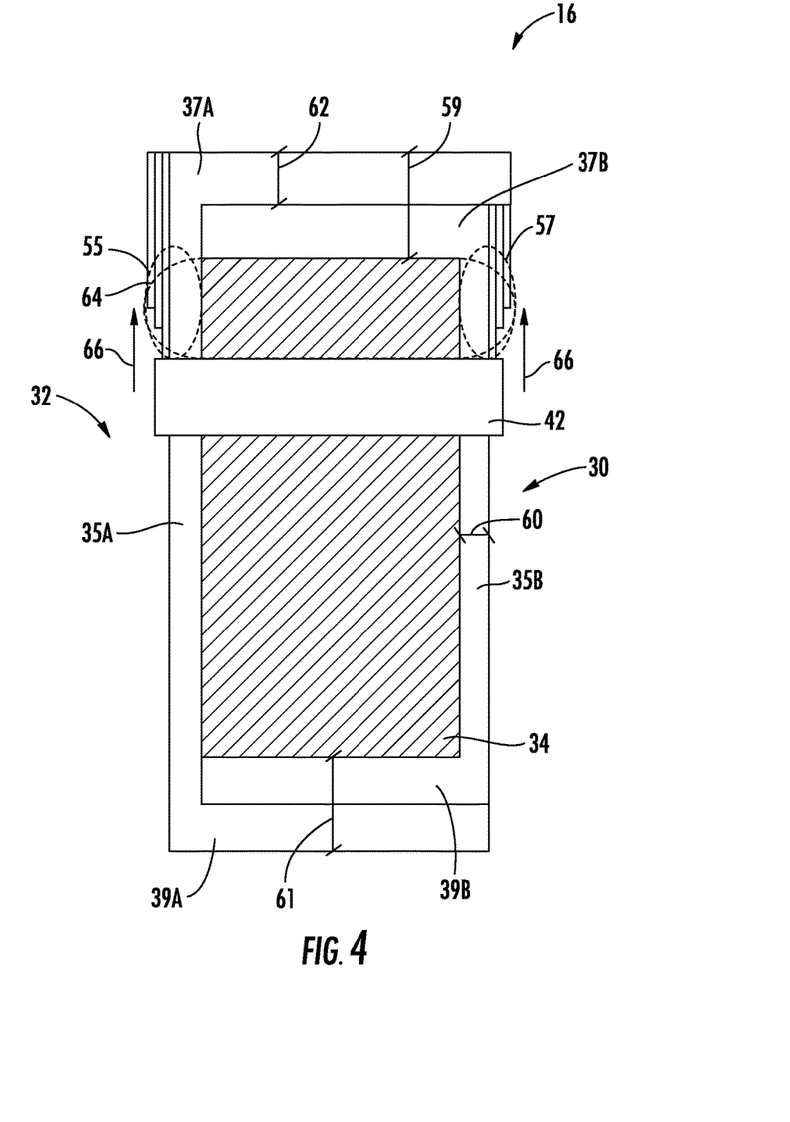
FIG. 4 is a profile view of the spreader bracket of FIG. 2.

FIG. 3 illustrates the spreader bracket 16 in a completed form. The first component 30 and the second component 32 have been coupled together to form a coupled structure that has a box shaped cross-section, as illustrated in FIG. 4. In some examples, the coupled structure may be referred to as a sandwiched structure, with the structural fill material 34 sandwiched between the two components 30, 32.

The spreader bracket 16 includes a transition portion 52 located approximately where the lower portion 38 transitions to the upper portion 36. The transition portion 52 can be any suitable curve (e.g., a smooth curve or sharp curve) that include any number of breaks or bends as it transitions between the lower portion 38 and the upper portion 36. The transition portion 52 can be designed to absorb impact energy during a crash event by closing the angle between the upper portion 36 and the lower portion 38. This can include for example, bending the arm rest mount 48 towards the front bushing of the tube bushings 40. To ensure that the transition portion 52 bends in a predictable manner, the spreader bracket 16 can include one or more crumple zones 50A-50C disposed within or adjacent to the transition portion 52. The composite material in the one or more crumple zones 50A-50C may be thinner than in other areas of the spreader bracket 16. In some examples, indentations or darts are formed into the surface of the spreader bracket 16 to form the one or more crumple zones 50A-50C.

During a crash event, the one or more crumple zones 50A-50C can function like a crumple zone on a front-end of a motor vehicle. However, instead of crumpling linearly opposite the impact force like the crumple zone of the motor vehicle, the one or more crumple zones 50A-50C can crumple inwardly in response to moment force being applied at or about the seatback pivot bushing 46. Application of the moment force at or about the seatback pivot bushing 46 will cause the rotation described herein.

FIG. 4 illustrates a profile view taken through the seatbelt anchor 42 of the spreader bracket 16. As can be seen in FIG. 4, the first component 30 includes the web 35B, the second or lower flange 39B, and the first an upper flange 37B. Together the second flange 39B, the web 35B, and the first flange 37B form a channel having a C-shaped cross-section with a hollow interior area. The hollow interior area of the first component 30 is bounded on the top by the first flange 37B, on the bottom by the second flange 39B, on the right side by the web 35B, and open on the left side. The hollow interior area, in the completed state illustrated in FIG. 4, is filled in with the structural fill material 34. The second component 32 similarly includes the web 35A, the second or lower flange 39A, and the first or upper flange 37A, which also form a channel having a C-shaped cross-section with a hollow interior area. The hollow interior area of the second component 32 is bounded on the top by the first flange 37A, on the bottom by the second flange 39A, on the left side by the web 35A, and open on the right side. In some examples, widths of the webs 35A and 35B, the first flanges 37A and 37B, and the second flanges 39A and 39B may be varied to ensure suitable strength and energy absorption. For example, a first width 60 of the web 35B may be less than a first width 62 of the first flange 37A.

The spreader bracket 16 can include a crush zone 64. The crush zone 64 can be defined as extending from an exterior surface of the seatbelt anchor 42 towards the first flanges 37A, 37B located on top/forward portion of the spreader bracket 16 (when the spreader bracket is mounted in the seat assembly 12). The crush zone 64 can also include reinforcing zones 55 and 57 of the webs 35A and 35B, which may be portions of the webs that are located within the crush zone 64. The reinforcing zones 55, 57 can be reinforced as compared to other portions of the webs 35A, 35B because they have one or more additional layers of composite material (e.g., sheet patches). The additional layers may be staggered in order to increase laminate thickness of the webs 35A, 35B and/or rotated to adjust grain direction of the additional layers. Thus, the additional layers can be considered steps that gradually increase the thickness of the webs 35A, 35B. The gradual increase in thickness correlates to an increased ability of the spreader bracket 16 to absorb impact energy during a crash event. The thickness of the additional layers, their placement relative to each other, and other properties (e.g., grain direction) can be tuned such that the crush zone 64, including the reinforcing zones 55, 57, crush in predictable manner as the seatbelt anchor 42 is pulled towards the crush zone 64 during a crash event.

Arrows 66 indicate a direction of a force exerted on the seatbelt anchor 42 by the seatbelt when an occupant is buckled into the seat. During a crash event, the force exerted on the seatbelt anchor 42 by the occupant can cause the seatbelt anchor 42 to translate (in some cases, with some degree of rotation) in the direction of the arrows 66 through the crush zone 64. A portion of energy associated with the force will be dissipated as the seatbelt anchor 42 tears through the structural fill material 34 located in the crush zone 64 and the reinforcing zones 55, 57. The thickness and number of additional layers in the reinforcing zones 55, 57 may be selected to ensure that the seatbelt anchor 42 moves through the spreader bracket 16 in a predictable manner, absorbing energy along the way, but not failing so critically that the seatbelt anchor 42 is entirely removed from within the spreader bracket 16. In some examples, an overall width 59 of the first flanges 37A, 37B directly opposite the seatbelt anchor 42 may be determined to ensure that the seatbelt anchor 42 cannot break thorough the spreader bracket 16 during a crash event. In some examples, the overall width 59 may be greater than an overall width 61 of the second flanges 39A, 39B. In this manner, the seatbelt anchor 42 can move through the crush zone 64, but cannot entirely break through the spreader bracket 16 (e.g., by stopping near the first flanges 37A, 37B). The first flanges 37A, 37B may also have more highly orientated fibers in the areas adjacent to the crush zone 64.

Figure 5:
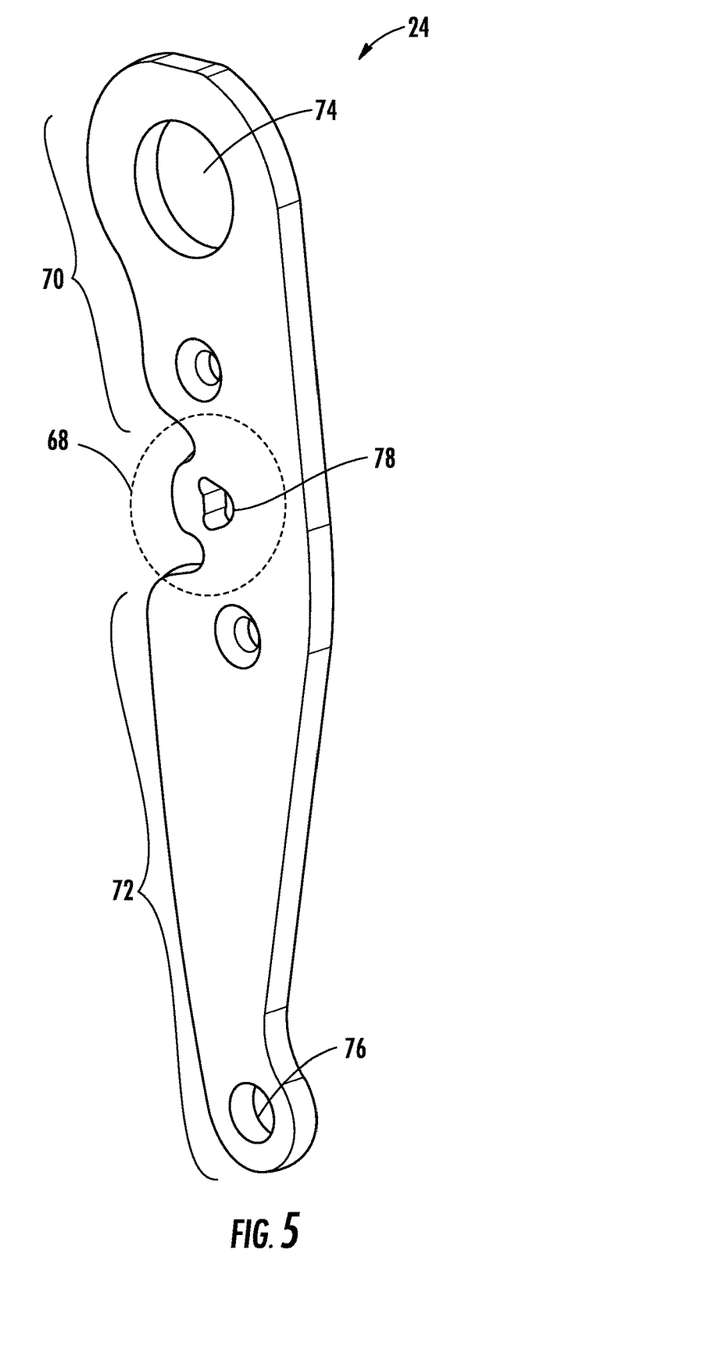
FIG. 5 is a perspective view of a seat bracket from FIG. 1, according to at least one embodiment.

FIG. 5 illustrates a perspective view of the seat bracket 24. The seat bracket 24 has a generally elongated plate-like shape. The seat bracket 24 can be formed from any suitable reinforced composite material such as carbon fiber reinforced polymers, carbon fiber reinforced plastics, carbon fiber reinforced thermoplastics, or any other suitable reinforced composite material. Thus, the seat bracket may be manufactured using any suitable composite manufacturing technique including, for example, thermoplastic structural composite techniques or thermoset structural composite techniques.

The seat bracket 24 includes a frangible structure 68 disposed between an upper portion 70 and a lower portion 72. The upper portion 70 includes a first attachment location 74 for attaching the seat bracket 24 to the seatback 20 and the spreader bracket 16 at one of the upper mounting locations 22. The lower portion 72 includes a second attachment location 76 for attaching the seat bracket 24 to the seat pan 28.

The frangible structure 68 includes a third attachment location 78 for attaching the seat bracket 24 to the seatback 20. The third attachment location 78 corresponds to the frangible mounting location 26 disposed below the upper mounting location 22.

Figure 6:
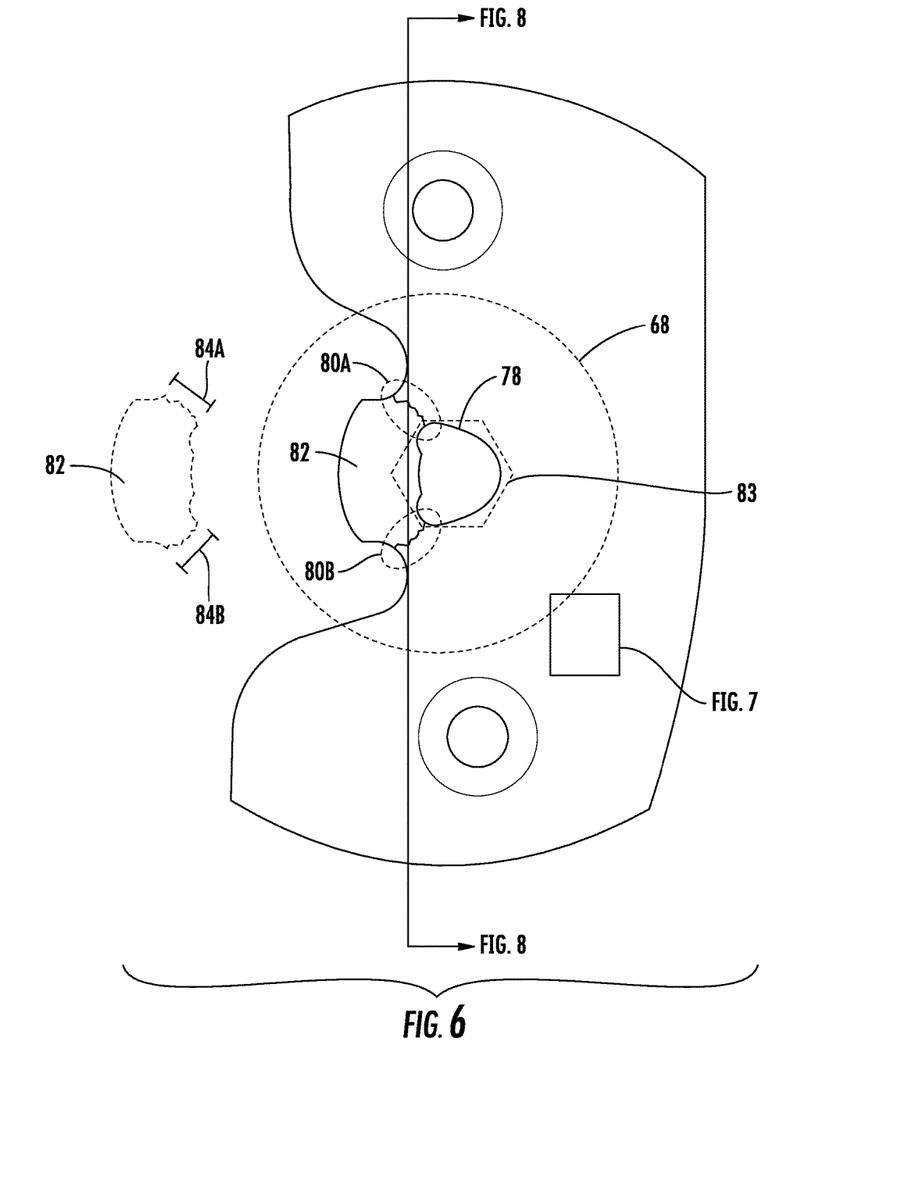
FIG. 6 is a side view of the seat bracket of FIG. 5.

FIG. 6 illustrates a detailed view of the frangible structure 68 of the seat bracket 24. The frangible structure 68 includes the third attachment location 78, one or more shear areas 80A, 80B, and a breakout portion 82. The breakout portion 82 is attached to the remaining portion of the frangible structure 68 via the shear areas 80A, 80B. The shear areas 80A, 80B are configured to fail during a crash event and allow the breakout portion 82 to be disconnected from the remaining portion of the frangible structure 68. Functionally, the load required to tear the breakout portion 82 may be applied on the seatback 20. This load can be transferred to the seat bracket 24 via a bolt 83 that attaches the seat bracket 24 to the seatback 20 at the third attachment location 78. The load is then transferred from the bolt 83 to the breakout portion 82, which causes the shear areas 80A, 80B to fail, if the load is greater than what the shear areas 80A, 80B can withstand. In this manner, the failure of the seat bracket 24 can be predictable and tuned to a particular load.

In some examples, greater or fewer shear areas may be included in the seat bracket 24. For example, a single shear area may be included that corresponds in size to a diameter of the bolt 83. Additionally, while the breakout portion 82 and the third attachment location 78 are illustrated as having particular shapes, it is understood that these features may have any suitable shapes. For example, the third attachment location 78 may be formed in the shape of a circle and the breakout portion 82 may have a uniform rectangular shape. In addition, in some examples, the shape of the frangible structure 68 may be altered to exclude the two radius cuts that define the outside edge of the breakout portion 82.

In some examples, the shape of the features in the frangible structure 68 and the composition of the composite materials in these regions may define how the shear areas 80A, 80B fail during the crash event, including the amount of force required for the seat bracket 24 to fail. For example, thickness 84A, 84B corresponding to the shear areas 80A, 80B may be varied during manufacturing in order to reduce or increase the force required to tear the breakout portion 82.

Figure 8:
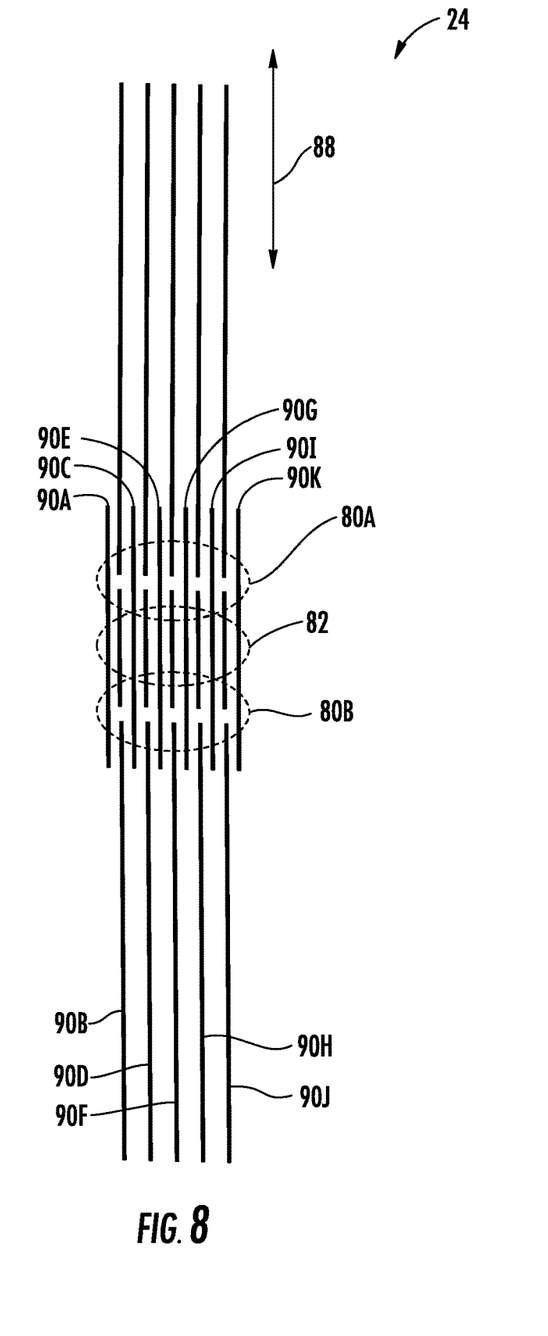
FIG. 8 is a profile view of a portion of the seat bracket of FIG. 6.

In some examples, the seat bracket 24 (and other brackets (e.g., the spreader bracket 16)) may be formed as a quasi-isotropic laminate. For example, FIG. 8 illustrates a detailed view of a portion of the seat bracket 24 from FIG. 6 including a quasi-isotropic laminate. The area in FIG. 8 illustrates the seat bracket 24 as including layers with grains aligned in four different layer orientations. A first layer orientation of "90 degrees" can correspond to the layer represented by grains 89. In this example, the orientation of the grains 89 in the first layer extend up and down vertically in FIG. 8. The 90 degree orientation may be considered a dominant layer orientation and may correspond to the longest side of the seat bracket 24. A second layer orientation of "0 degrees" can correspond to the layer represented by grains 91. In this example, the orientation of the grains 91 in the second layer extend side-to-side horizontally in FIG. 8. The 0 degree orientation may be considered a transverse layer orientation as compared to the dominate layer orientation. A third layer orientation of "+45 degrees" can correspond to the layer represented by grains 93. In this example, the orientation of the grains 93 in the third layer extend from the bottom-left corner to the top-right corner in FIG. 8. A fourth layer orientation of "−45 degrees" can correspond to the layer represented by grains 95. In this example, the orientation of the grains 95 in the fourth layer extend from the bottom-right corner to the top-left corner in FIG. 8. It is understood that the seat bracket 24 can include more layers than the four discussed with reference to FIG. 8. Additionally, the layer orientations may be arranged in any suitable manner, with similar orientations together or with similar orientations separated by different orientations.

Figure 7:
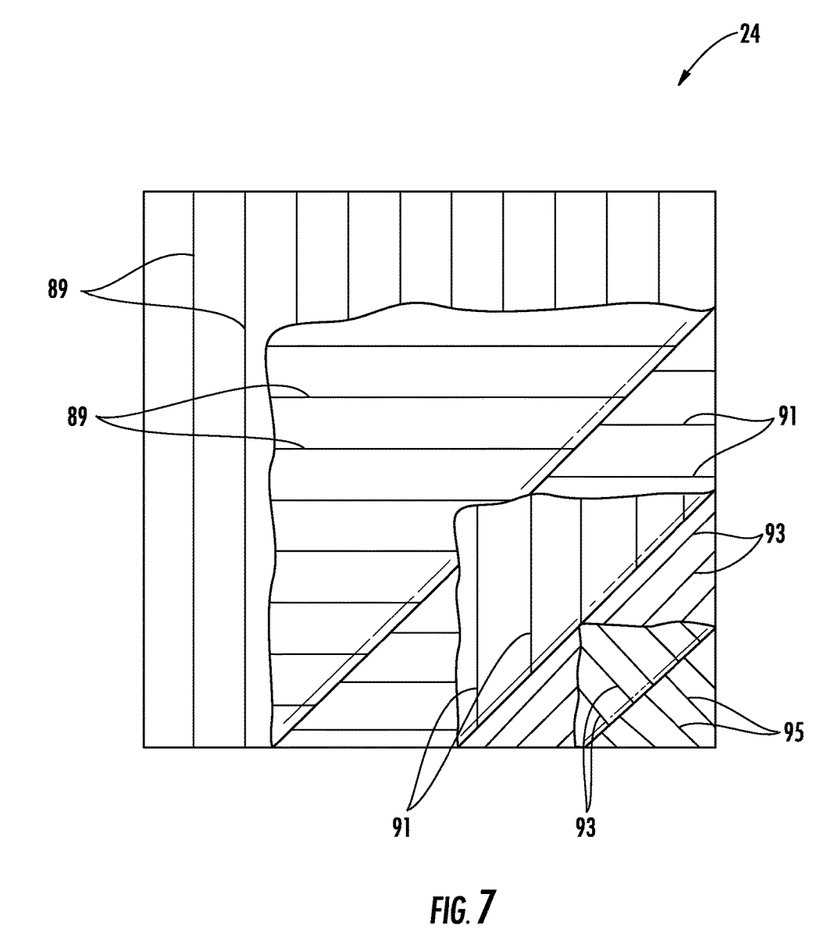
FIG. 7 is a detailed view of a portion of the seat bracket of FIG. 6.

FIG. 7 illustrates a profile view of a portion of the seat bracket 24 taken through the shear areas 80A, 80B and the breakout portion 82. The dominant layer orientation in FIG. 7 is about parallel to arrow 88. As illustrated in FIG. 7, the seat bracket 24 can include a plurality of layers 90 aligned in the dominant layer orientation, which corresponds to the orientation of the grains 89. The plurality of layers 90 may correspond to layers or plies of reinforcing material. It is understood that the seat bracket 24 can include other layers aligned according to other layer orientations that are not shown in FIG. 7 (e.g., 0 degrees, +45 degrees, and −45 degrees). For example, as illustrated in FIG. 8, the seat bracket 24 can include four orientations of grains in multiple different layers. In some examples, the seat bracket 24 can include about between 25-35 layers having thickness about between 0.005" and 0.006". The orientation of the grains in each layer can be selected as described herein or in any other suitable manner. In other examples, however, the seat bracket 24 can any suitable number of layers having any suitable thicknesses other than those recited above.

The shear areas 80A, 80B may be formed by varying characteristics of portions of the layers at or around the shear areas 80A, 80B. For example, varying the characteristics can include overlapping layers, cutting layers so that their respective fibers are discontinuous, cutting or etching layers to reduce the strength of the layers, or performing any other suitable adjustment to predictably vary the strength of the seat bracket 24 at the shear areas 80A, 80B. As illustrated in FIG. 7, the layers 90A, 90C, 90E, 90G, 90I, and 90K can be continuous throughout the shear areas 80A, 80B. While illustrated as being short segments, the layers 90A, 90C, 90E, 90G, 90I, and 90K can also extend the full length of the seat bracket 24 or of the frangible structure 68. In some examples, the layers 90B, 90D, 90F, 90H, and 90J can be discontinuous through the shear areas 80A, 80B. During manufacturing, the layers 90B, 90D, 90F, 90H, and 90J can be laid down as continuous layers and then cut to become discontinuous or may be pre-cut or otherwise laid down as multiple discontinuous segments. In this manner, the layers 90 may be arranged in a particular manner to achieve predictable failure at the shear areas 80A, 80B.

In some examples, the shear areas 80A, 80B may be configured to fail in the direction of any one or more of the layer orientations. For example, the first shear area 80A may be configured to fail parallel to the −45 degree layer orientation. Conversely, the second shear area 80B may be configured to fail parallel to the +45 degree layer orientation. When a single shear area is present, the single shear area may be configured to fail parallel to the 0 degree layer orientation. In some examples, the shear areas 80A, 80B do not align with any of the layer orientations. When the shear areas 80A, 80B fail, at least a portion of the frangible structure 68 may also be affected. For example, certain ones of the layers 90 may be delaminated from each other or otherwise be torn. In some examples, the bolt 83 may be configured to fail in conjunction with the shear areas 80A, 80B. For example, the bolt 83 can be formed from composite material and be configured to sheer in response to application of a predefined force.

Figure 9A:
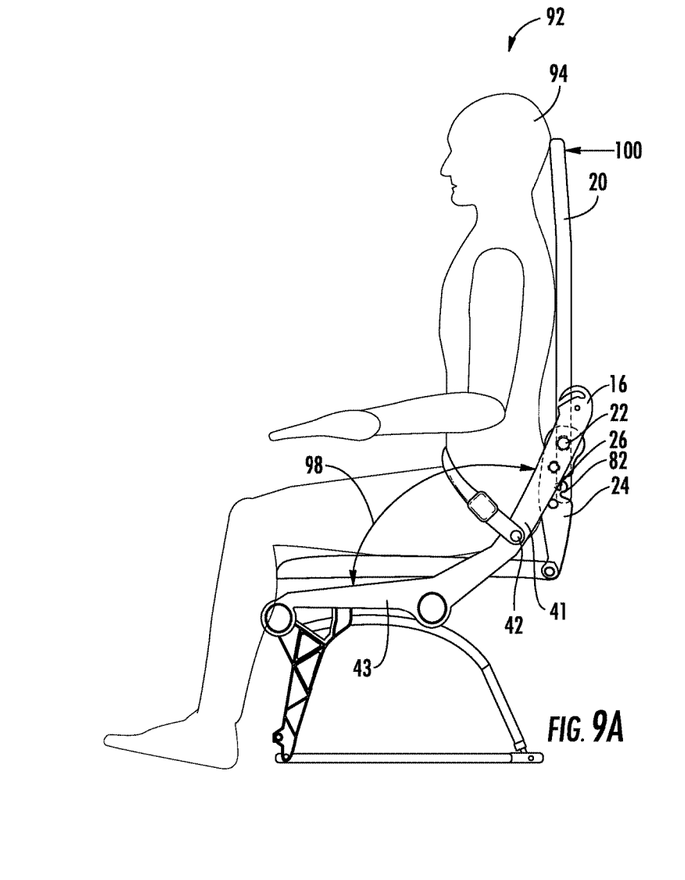
FIG. 9A is a side view of a seat assembly including an occupant prior to a crash event, according to certain embodiments.

FIG. 9A illustrates a seat assembly 92 including an occupant 94 prior to a crash event. The seat assembly 92 is an example of the seat assembly 12 described herein. The seat assembly 92 includes the spreader bracket 16 and the seat bracket 24 as described herein. For example, the spreader bracket 16 can be attached to the seatback 20 and the seat bracket 24 at one of the upper mounting locations 22. The seat bracket 24 can be attached to the seatback 20 at one of the upper mounting locations 22 and at one of the frangible mounting locations 26. At the frangible mounting location 26, the seat bracket 24 is attached to the seatback 20 via the bolt 83. The spreader bracket 16 can be defined as having the upper leg 41 extending in a first direction and the lower leg 43 extending in a second direction. Prior to the crash event, the upper leg 41 and the lower leg 43 may be separated by an angle 98 having a first value.

Figure 9B:
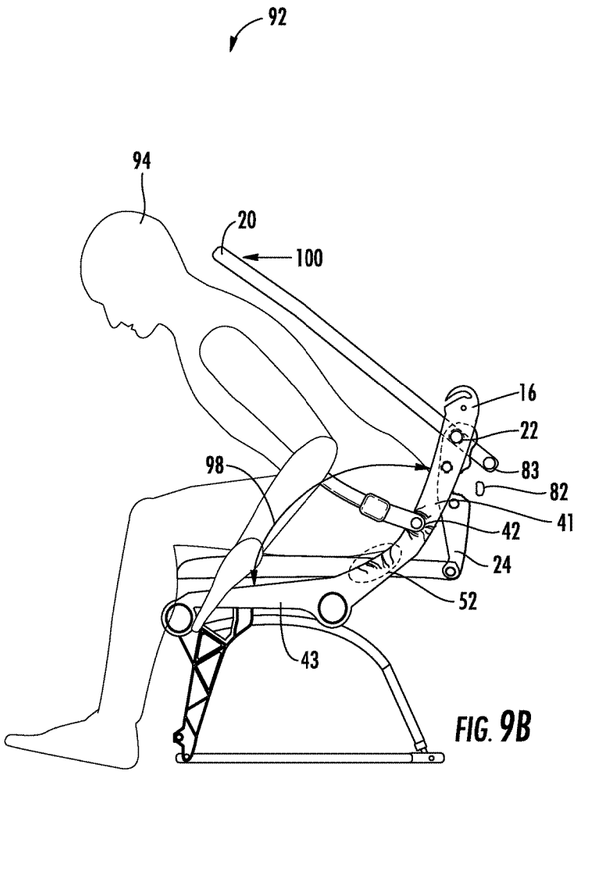
FIG. 9B is a side view of the seat assembly of FIG. 9A during the crash event, according to certain embodiments.

FIG. 9B illustrates the seat assembly 92 including the occupant 94 after a crash event. During the crash event, certain features of the seat assembly 92 described herein absorb energy generated during a crash event and allow the seatback 20 to pivot. Such absorption can function to decelerate the occupant 94 in order to reduce trauma and can also reduce the likelihood that the seat assembly 92 becomes unattached from the floor. Pivoting of the seatback 20 can reduce the likelihood of head trauma to occupants sitting in rows behind the seat assembly 92, which may help achieve a suitable HIC.

During the crash event, the spreader bracket 16 can bend such that the upper leg 41 of the spreader bracket 16 rotates towards the lower leg 43. In some examples, during the crash event, the spreader bracket 16 can bend such that the lower leg 43 of the spreader bracket 16 rotates towards the upper leg 41. Such bending, in either case, can be designed to take place at or around the transition portion 52 along one or more crumple zones 50 described herein. Thus, after the crash event, the one or more crumple zones 50 have crumpled and the angle 98 has closed some as compared to the pre-crash state (i.e., a second value of the angle 98 may be less than the first value of the angle 98). The bending of the spreader bracket 16 can function to absorb some of the crash energy.

During the crash event, the seatbelt anchor 42 translates (and possibly rotates) from a first position associated with a pre-crash state to a second position associated with a post-crash state. As the seatbelt anchor 42 moves during the crash, it crushes material in its path (e.g., material in the crush zone 64). The crushing of this material can function to absorb some of the crash energy.

During the crash event, a rearward occupant seated behind the seatback 20 can be thrust forward against a rear surface of the seatback 20. A load 100 associated with the rearward occupant being thrust into the seatback 20 is represented by the arrow. In some examples, the load 100 is greater than a breakaway force (e.g., a force at which the seat bracket 24 breaks and allows the seatback 20 to pivot (e.g., between 300 lbs and 400 lbs)). As the load 100 is applied to the rear surface of the seatback 20, the load 100 is transferred through the seatback 20 to the seat bracket 24 via the bolt 83. Prior to the breakout portion 82 completely failing (i.e., allowing the bolt 83 through the backside of the seat bracket 24), the seat bracket 24 absorbs some crash energy as the bolt 83 is forced into the breakout portion 82. In addition, once the load 100 exceeds the breakaway force, the breakout portion 82 completely fails and the seatback 20 is allowed to pivot forward. The occupant 94 also pivots forward along a same swing radius as the seatback 20. In this manner, the head of the occupant 94 ends up in her lap.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A seat assembly, comprising:
   a frame;
   a set of spreader brackets attached to the frame, each spreader bracket comprising:
      a first component formed from a composite material;
      a structural fill material; and
      a second component formed from the composite material, the second component configured to couple with the first component to form a coupled structure, the structural fill material extending within a cavity of the coupled structure; and
   a set of seat brackets attached to the set of spreader brackets, each seat bracket comprising:
      a frangible structure formed from a plurality of layers of the composite material, wherein, in a particular layer orientation, the plurality of layers is arranged such that:
         first layers of the plurality of layers are discontinuous throughout a shear area of the frangible structure; and
         second layers of the plurality of layers are continuous throughout the shear area of the frangible structure, the frangible structure configured to break at or near the shear area in response to a load applied to a seatback.

2. The seat assembly of claim 1, further comprising:
   a seat pan disposed between lower portions of the set of spreader brackets; and
   the seatback disposed between upper portions of the set of spreader brackets and attached to the set of spreader brackets.

3. The seat assembly of claim 2, wherein each seat bracket further comprising:
   a lower portion attached to the seat pan;
   an upper portion attached to the seatback at a first location and at least one spreader bracket; and
   a middle portion corresponding to the frangible structure that is attached to the seatback at a second location.

4. The seat assembly of claim 1, wherein each of the first component and the second component comprises:
   a first flange;
   a second flange; and
   a web extending between the first flange and the second flange.

5. An assembly, comprising: a spreader bracket comprising:
   a first hollow component formed from a composite material; a fill material; and
   a second hollow component formed from the composite material, the second hollow component being configured to couple with the first hollow component to form a coupled structure, the fill material extending within a cavity of the coupled structure, the coupled structure comprising:
      a first leg extending in a first direction and including one or more upper mounting locations; and
      a second leg extending in a second direction and including one or more lower mounting locations disposed along a bottom portion of the second leg.

6. The assembly of claim 5, wherein the one or more upper mounting locations comprise a seatbelt anchor extending within the cavity of the coupled structure from a first exterior surface on a first web of the first hollow component to a second exterior surface on a second web of the second hollow component.

7. The assembly of claim 6, wherein the coupled structure further comprises:
a first reinforcing zone comprising first one or more layers of the composite material disposed on the first web and extending between the seatbelt anchor and a first front flange of the first hollow component; and
a second reinforcing zone comprising second one or more layers of the composite material disposed on the second web and extending between the seatbelt anchor and a second front flange of the second hollow component.

8. The assembly of claim 7, wherein the first one or more layers of the first reinforcing zone and the second one or more layers of the second reinforcing zone are selected such that, in a crash event, the seatbelt anchor moves toward the first front flange and the second front flange by crushing a portion of the fill material, a portion of the first reinforcing zone, and a portion of the second reinforcing zone.

9. The assembly of claim 5, wherein the one or more mounting locations comprise one or more tubular rings extending through the cavity of the coupled structure from a first exterior surface on a first web of the first hollow component to a second exterior surface on a second web of the second hollow component.

10. The assembly of claim 5, wherein the fill material comprises an energy absorbing foam material having a density of about 10 pounds per cubic foot.

11. The assembly of claim 5, wherein the composite material comprises a thermoplastic structural composite or a thermoset structural composite.

12. The assembly of claim 5, wherein each hollow component of the first hollow component and the second hollow component comprises:
a first flange;
a second flange; and
a web extending between the first flange and the second flange, at least one of the first flange or the second flange having a flange thickness that is greater than a web thickness of the web.

13. The assembly of claim 5, wherein, in the coupled structure, an interior surface of the first hollow component contacts an exterior surface of the second hollow component.

14. The assembly of claim 5, wherein, in the coupled structure the first hollow component comprises one or more darts disposed between the first leg and the second leg.

15. The assembly of claim 5, further comprising: a seat bracket comprising:
an attachment location at which the seat bracket is attached to the spreader bracket; and
a frangible portion disposed below the attachment location and formed from a plurality of layers of the composite material, wherein, in a particular layer orientation, the plurality of layers are arranged such that:
first layers of the plurality of layers are discontinuous throughout a shear area of the frangible portion; and
second layers of the plurality of layers are continuous throughout the shear area of the frangible portion, the frangible portion configured to break at or about the shear area in response to a load applied to a seatback.

16. The assembly of claim 15, wherein the shear area is a first shear area, and wherein the plurality of layers are further arranged such that:
the first layers of the plurality of layers are discontinuous throughout a second shear area of the frangible portion; and
the second layers of the plurality of layers are continuous throughout the second shear area of the frangible portion, the frangible portion configured to break at or about the first shear area and the second shear area in response to the force applied to the seatback.

17. An assembly, comprising:
a seat bracket comprising:
an upper portion comprising a first attachment location;
a lower portion comprising a second attachment location; and
a frangible portion disposed between the upper portion and the lower portion and formed from a plurality of layers of composite material, wherein, in a particular layer orientation, the plurality of layers are arranged such that:
first layers of the plurality of layers are discontinuous throughout a shear area of the frangible portion; and
second layers of the plurality of layers are continuous throughout the shear area of the frangible portion, the frangible portion being configured to break at the shear area when a predefined load is applied to the assembly.

18. The assembly of claim 17, wherein the shear area is a first shear area, and wherein the plurality of layers are further arranged such that:
the first layers of the plurality of layers are discontinuous throughout a second shear area of the frangible portion; and
the second layers of the plurality of layers are continuous throughout the second shear area of the frangible portion, the frangible portion configured to break at or about the first shear area and the second shear area in response to the predefined load applied to the assembly.

19. The assembly of claim 18, wherein the plurality of layers are further arranged such that third layers of the plurality of layers are continuous throughout the first shear area and the second shear area.

20. The assembly of claim 17, wherein the particular layer orientation is a dominant layer orientation, the plurality of layers of composite material comprising other layers arranged in at least one other orientation comprising an orthogonal layer orientation that is orthogonal to the dominant layer orientation or a transverse orientation that is transverse to the dominant layer orientation.

21. The assembly of claim 17, further comprising a spreader bracket attached to the seat bracket at the first attachment location, the spreader bracket comprising:
a first component formed from the composite material; a fill material; and
a second component formed from the composite material, the second component configured to couple with the first component to form a coupled structure, the fill material extending within a cavity of the coupled structure.

22. The assembly of claim 21, wherein the frangible portion comprises a third attachment location, the assembly further comprising:
a seat pan attached to the seat bracket at the second attachment location; and
a seatback attached to the seat bracket at the third attachment location and the first attachment location.

23. The assembly of claim 22, wherein the coupled structure further comprises:
a first leg extending in a first direction, the first leg comprising a seatbelt anchor extending within the cavity of the coupled structure from a first exterior surface of a first web of the first component to a second exterior surface of a second web of the second component; and a second leg extending in a second direction, the second direction separated from the first direction by a first angle.

24. The assembly of claim 23, wherein, during a crash event:

the frangible portion is configured such that application of the predefined load to an aft surface of the seatback causes the frangible portion to break at the shear area and an upper portion of the seatback to pivot about the first attachment location in a forward direction; and the seatbelt anchor is configured such that the seatbelt anchor moves through the cavity of the coupled structure towards a first flange of the first component and a second flange of the second component located on a forward side of the coupled structure; and the coupled structure is configured such that the first leg rotates relative to the second leg to form a second angle that is less than the first angle.

\* \* \* \* \*